I. F. VAN DUZER.
Plumbers' Joints.
No. 150,109.    Patented April 21, 1874.
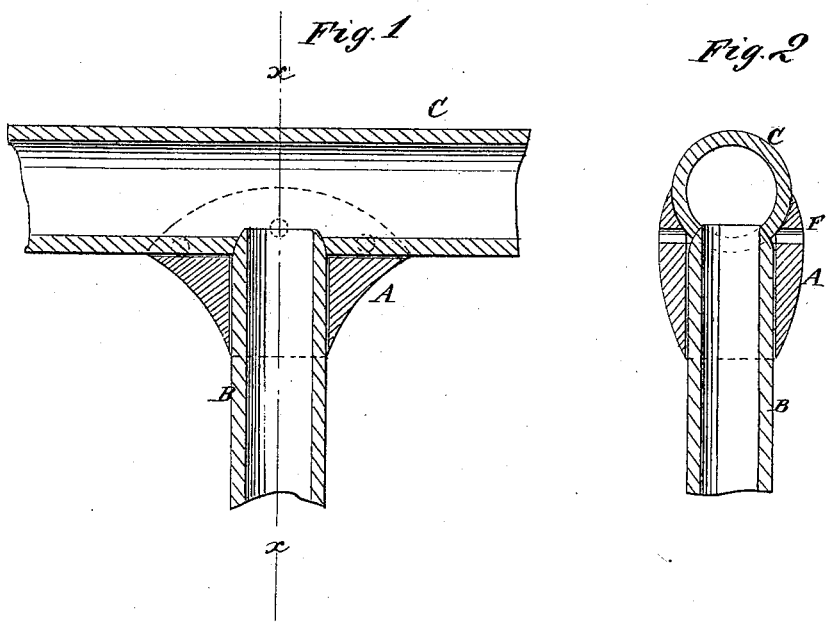
WITNESSES.
INVENTOR.
BY
ATTORNEYS.

UNITED STATES PATENT OFFICE.

ISAAC F. VAN DUZER, OF MIDDLETOWN, NEW YORK.

IMPROVEMENT IN PLUMBERS' JOINTS.

Specification forming part of Letters Patent No. 150,109, dated April 21, 1874; application filed February 7, 1874.

*To all whom it may concern:*

Be it known that I, ISAAC F. VAN DUZER, of Middletown, in the county of Orange and State of New York, have invented a new and useful Improvement in Plumbers' Joints, of which the following is a specification:

The invention will first be fully described, and then pointed out in the claim.

The object is, mainly, to substitute the cheaper metal lead for solder for the principal part of the joint, the lead being just as good for stiffening the joint as the solder, and the joint being just as firm when the lead is joined to the pipe by the solder. The pieces also facilitate somewhat in making the joint by requiring less labor.

Figure 1 is a longitudinal section, and Fig. 2 is a transverse section, of a pipe with a branch joined on by a T-coupler.

Similar letters of reference indicate corresponding parts.

A represents the T-coupler, of lead, for joining a branch, B, to the side of a pipe, C; it has merely a groove along the top to receive the side of the pipe C in it; but it has a hole through the center of it, at right angles to the groove, for the pipe B, the couplers A, made of lead, so as to slip onto the pipes easily to form the basis of the joint, and then fasten them by solder, overlapping them at the edges, and flowing in between the parts at the joints, and into the holes F, if necessary.

Having thus described my invention, I claim as new and desire to secure by Letters Patent—

The combination, with a pipe, C, and the branch pipe B, placed at right angles thereto, of the coupling-piece A, having groove to receive the pipe C, and aperture to receive the pipe B, as and for the purpose described.

ISAAC F. VAN DUZER.

Witnesses:
    JAS. B. HULSE,
    M. W. HALLOCK.